Feb. 9, 1971 T. LOEW 3,562,048
METHOD OF MAKING AN EMBOSSED LAMINATE
Filed Nov. 15, 1967
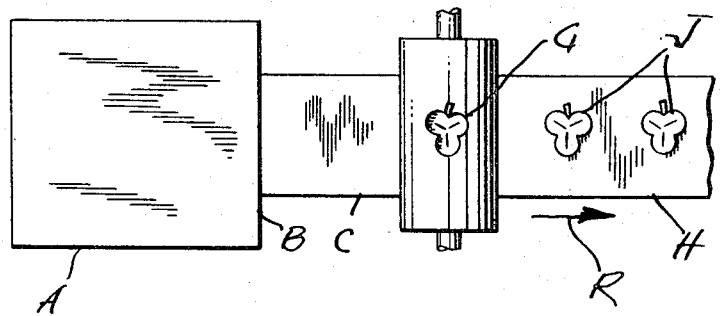
FIG.1
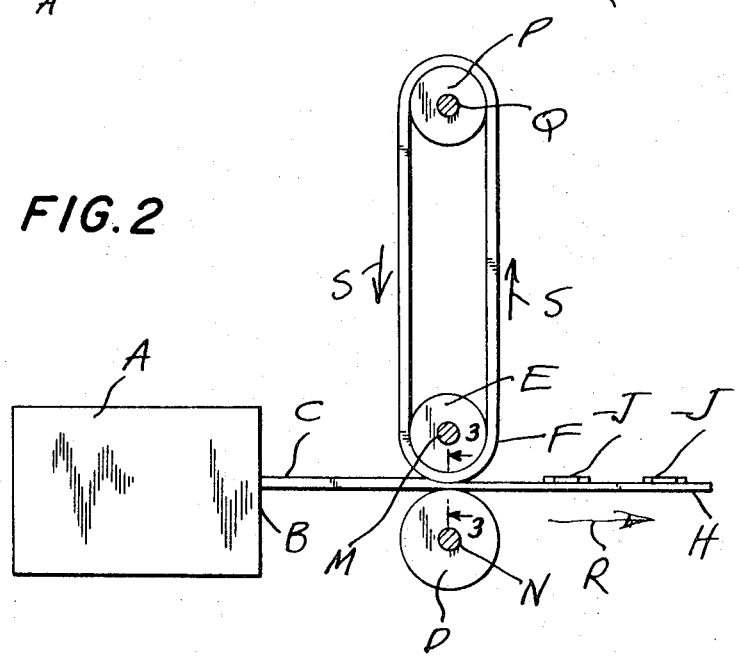
FIG.2
FIG.3
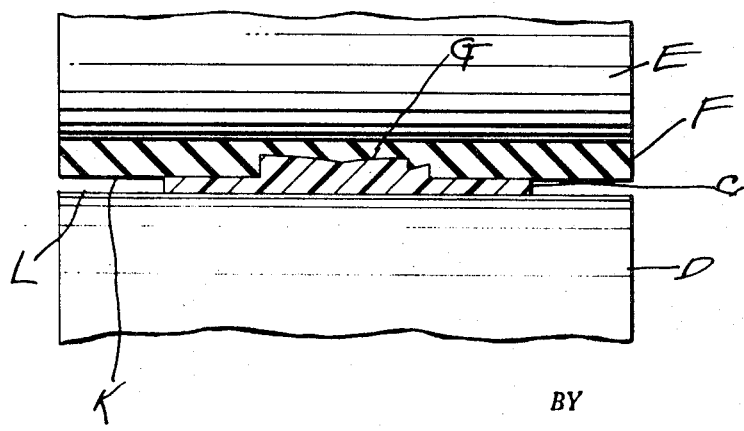
INVENTOR.
THEODORE LOEW
BY
ATTORNEY United States Patent Office 3,562,048
Patented Feb. 9, 1971

3,562,048
METHOD OF MAKING AN EMBOSSED LAMINATE
Theodore Loew, Schenectady, N.Y., assignor, by mesne assignments, to The Standard Products Company, a corporation of Ohio
Filed Nov. 15, 1967, Ser. No. 683,389
Int. Cl. B31f 7/00
U.S. Cl. 156—209                              6 Claims

ABSTRACT OF THE DISCLOSURE

The disclosure relates to a method of embossing or impressing designs upon an extruded thermoplastic strip, according to which the strip is passed between a bottom pressure roller and a top roller carrying a decorating belt. The belt has means thereon to cause embossments or impressions on the extruded polymer.

---

The present invention relates to an embossing or impressing method and it particularly relates to a method of impressing plastic sheet materials.

Although not limited thereto, the present invention will be particularly described in its application to a method of embossing or impressing sheet plastic materials of the nature of vinyl or polyolefin polymers or copolymers while in hot plastic extruded condition.

It is among the objects of the present invention to provide a simple embossing or impressing system which will eliminate caustic metal dyes and more readily enable application of various designs to a sheet or strip of material, without particular regard to the size or diameter of the embossing or impressing cylinder, as the case may be.

Another object is to provide a high speed, simplified, reliable embossing or impressing system, which is particularly adaptable to relatively soft, hot, extruded sheets or strips of thermoplastic resinous sheet materials, and which will eliminate the cost of embossing or engraving large or expensive metal or copper cylinders.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a silicone rubber material which may carry a design and which may be adjustably impressed upon a plastic sheet of material, while at the same time regulating the thickness of the sheet of material.

Desirably, the material is a copolymer of vinyl chloride and vinyl acetate, with the chloride and acetate being in approximately equal proportions and with 10 to 30% of butadiene. This material is desirably extruded at a temperature of about 350 to 400° F., at a thickness of about ¼ to ½ inch and in a strip or sheet which may vary from ¼ inch to 5 or more inches in width.

While the material substantially retains all of the heat of the extrusion, it is desirably run between a lower pressure roller of blank face and an upper pressure roller carrying a belt of a hard material, yet sufficiently plastic to ride over the roller, and carrying an elongated or spaced designs which are either elevated from or recessed into the surface of the belt.

Desirably, a pressure is applied, varying between 50 to 150 pounds per square inch depending upon the fluidity of the heated polymer, so that the polymers compress without substantial lateral extension while the embossed or recessed design is formed thereon. This operation may be carried out at fairly high speed and without any difficulties of separation between the embossing and engraving belt and the plastic material.

Desirably, the plastic material is not reduced in thickness more than 10 to 20% and the belt is of sufficient length that while passing through the air it will be cooled so that a cool face thereof will at all times contact the face of the extruded material which is to be embossed.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

FIG. 1 is a top diagrammatic plan view showing an operation of the embossing or engraving belt upon the strip of plastic material.

FIG. 2 is a side elevational view of the arrangement in FIG. 1.

FIG. 3 is a fragmentary vertical sectional view upon an enlarged scale as compared to FIG. 2, showing the contact of the belt with the extruded plastic sheet.

Referring to FIGS. 1 to 3, there is shown an apparatus A which is an extruder receiving granular copolymer and elevating into such a temperature that it may be pressed through an opening in the wall B to form a hot plastic strip C which is then passed above the pressure roller D and under the roller E carrying the pattern belt F.

The pattern belt F will carry a series of engravings or embossments G, which will be impressed upon the hot plastic strip C somewhat reducing its thickness as indicated at H and leaving the duplicates of the engraving thereon, as indicated at J.

The belt belt F is made of a relatively hard silicone rubber or some other material, or it may be a leather or fabric belt carrying flexible engravings embossed thereon.

Desirably the fabric strip C is pressed between the surfaces K of the belt F and L of the roller D. The rollers D and E are carried on the spindles M and N. The belt is also carried on the idler roller P on the spindle , and this distance may be changed in respect to the roller E and the spindle M, so as to give sufficient tension to the belt F.

The use of the belt F permits any suitable shape, length or width of design G or J without restriction as is true of copper cylinders due to their width or diameter. Long embossments may be placed upon the belt F and the belt F may be of any suitable length, size or shape.

The embossed strip H will move in the direction R as the belt F moves in the direction S, and it may thereafter be combined with suitable reinforcing strips or cut or beaded as the case may be. It may be used for a wide variety of ornamental purposes, as for instance decoration of automotive interiors, rooms, clothing, household appliances, furniture, various types of covers, and it forms a very convenient way of applying trademarks, symbols, slogans or even wording or messages on metal, cloth or plastic materials, for example with vinyl sheet clothing, hats, skirts or coats.

The belt F may be made in as many sections or as long as desired, and it eliminates the necessity of preparing and maintaining a large number of engraved rollers.

It has been found that most satisfactory results are achieved when the belt F is moved at a slightly greater speed than the material C is being extruded, so that any tendency toward lateral movement will be changed into a long elongation and the figures J will have better definition and will be somewhat less compressed than the body of the belt H.

The decoration J then has a density of about 5% less, and sometimes between 3 to 10% less than the actual strip H. At the same time, over the roller D it may be desirable to feed a reinforcing sheet or strip or backing, whether of fabric or sheet material, which will reinforce the embossed strip H.

The silicone rubber making up the material of the belt F preferably will be resistant to heat of at least a temperature more than 100° F. above the temperature of the hot extruded material.

As many changes could be made in the above method of embossing or impressing and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed.

What is claimed is:

1. A method of embossing a hot plastic strip and utilizing a heated extruder, pressure roll means, movable endless belt means having embossing means thereon, and means to drive said belt means to move said embossing means past said pressure roll means, the invention comprising extruding a hot plastic strip, and embossing said strip by feeding said strip between said pressure roll means and said belt means to emboss the surface of said strip facing said belt means.

2. In the method of claim 1, said hot plastic strip being at a temperature of between 350° and 400° F.

3. The method of claim 2, and cooling said embossed strip to reduce the temperature thereof to 150° F.

4. The method of claim 1, and driving said belt means at a greater speed than that at which said strip is fed between said roll and belt means.

5. The method of claim 1, and feeding reinforcing backing material between said pressure roll means and said hot plastic strip for integrated bonding with said hot plastic strip as said strip passes between said roll means and belt means.

6. The method of claim 1, and spacing said roll means and belt means for said hot plastic strip to be reduced in thickness by about 10 to 20 percent as said strip passes between said roll and belt means.

References Cited

UNITED STATES PATENTS

| | | | |
|---|---|---|---|
| 2,205,466 | 6/1940 | Caprio et al. | 156—219 |
| 2,306,256 | 12/1942 | Wickwire et al. | 156—219 |
| 3,104,192 | 9/1963 | Hacklander | 156—219X |

BENJAMIN R. PADGETT, Primary Examiner

S. J. LECHERT, JR., Assistant Examiner

U.S. Cl. X.R.

156—219, 220, 244, 306; 264—210